United States Patent
Bramley

(10) Patent No.: US 11,928,385 B2
(45) Date of Patent: Mar. 12, 2024

(54) SOUND PROCESSING LOGIC CONNECTIONS

(71) Applicant: Hewlett-Packard Development Company, L.P., Spring, TX (US)

(72) Inventor: Richard Bramley, Mansfield, MA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 168 days.

(21) Appl. No.: 17/293,304

(22) PCT Filed: Jul. 30, 2019

(86) PCT No.: PCT/US2019/044095
§ 371 (c)(1),
(2) Date: May 12, 2021

(87) PCT Pub. No.: WO2021/021125
PCT Pub. Date: Feb. 4, 2021

(65) Prior Publication Data
US 2022/0147308 A1 May 12, 2022

(51) Int. Cl.
G06F 3/16 (2006.01)
H04M 3/56 (2006.01)
H04R 3/00 (2006.01)

(52) U.S. Cl.
CPC ............ *G06F 3/165* (2013.01); *H04M 3/568* (2013.01); *H04R 3/00* (2013.01)

(58) Field of Classification Search
CPC ..... G06F 3/165; H04M 3/568; H04M 1/6008; H04M 1/72448; H04M 1/68; H04R 3/00
See application file for complete search history.

(56) References Cited

U.S. PATENT DOCUMENTS

| | | | |
|---|---|---|---|
| 6,556,665 B1 | 4/2003 | Suzuki et al. | |
| 9,158,496 B2 | 10/2015 | Soffer | |
| 9,659,577 B1* | 5/2017 | Langhammer | H04R 5/02 |
| 10,521,185 B1* | 12/2019 | Kim | H04R 3/00 |
| 2002/0022500 A1* | 2/2002 | Minematsu | H04M 1/72513 455/556.1 |
| 2004/0192403 A1* | 9/2004 | Lejman | H04M 1/6075 455/350 |
| 2004/0204042 A1* | 10/2004 | Neaves | H04M 1/72513 455/66.1 |

(Continued)

FOREIGN PATENT DOCUMENTS

| CN | 1247428 A | 3/2000 |
|---|---|---|
| CN | 101127985 A | 2/2008 |

(Continued)

*Primary Examiner* — Oyesola C Ojo
(74) *Attorney, Agent, or Firm* — Knobbe, Martens, Olson & Bear, LLP

(57) ABSTRACT

In an example implementation according to aspects of the present disclosure, a method of a computing device may include determining whether a first mode or a second mode is selected. If the first mode is selected, the computing device connects a microphone to a sound processing logic. If the second mode is selected, the computing device disconnects the microphone from the sound processing logic and connecting an audio source to the sound processing logic.

15 Claims, 3 Drawing Sheets

(56) References Cited

U.S. PATENT DOCUMENTS

| | | | |
|---|---|---|---|
| 2005/0065778 A1* | 3/2005 | Mastrianni | H04K 3/825 |
| | | | 704/E21.014 |
| 2007/0116205 A1 | 5/2007 | Miller | |
| 2011/0123018 A1 | 5/2011 | Chuang et al. | |
| 2013/0219525 A1* | 8/2013 | Soffer | G06F 3/162 |
| | | | 710/14 |
| 2013/0249699 A1* | 9/2013 | Liu | H04M 1/19 |
| | | | 340/654 |
| 2013/0251173 A1* | 9/2013 | Ejima | H04R 1/08 |
| | | | 381/77 |
| 2014/0365073 A1 | 12/2014 | Stanek et al. | |
| 2018/0165472 A1* | 6/2018 | Adams | G06F 21/83 |
| 2018/0352315 A1* | 12/2018 | Gelling | H04M 1/72454 |
| 2021/0326373 A1* | 10/2021 | Gasparic | G06F 16/438 |

FOREIGN PATENT DOCUMENTS

| | | |
|---|---|---|
| CN | 101385324 A | 3/2009 |
| CN | 102075610 A | 5/2011 |
| CN | 104243686 A | 12/2014 |
| CN | 109473097 A | 3/2019 |
| EP | 0052347 A1 | 5/1982 |
| RU | 2219674 C1 | 12/2003 |
| WO | 2001/015410 A2 | 3/2001 |
| WO | WO-2013144966 A1 | 10/2013 |
| WO | WO-2015066389 A1 | 5/2015 |
| WO | 2019/118933 A1 | 6/2019 |

* cited by examiner

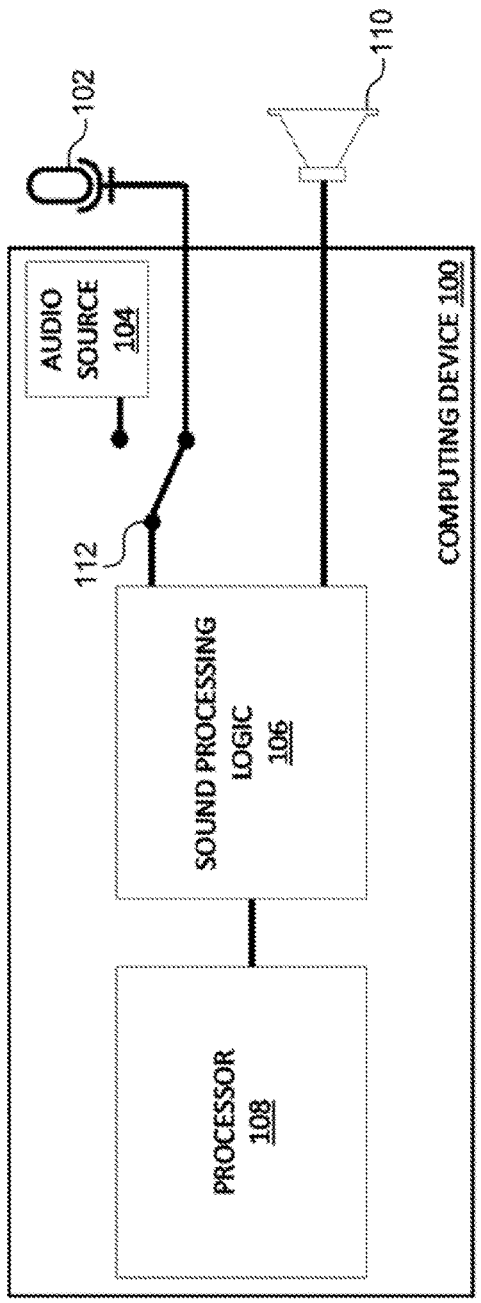
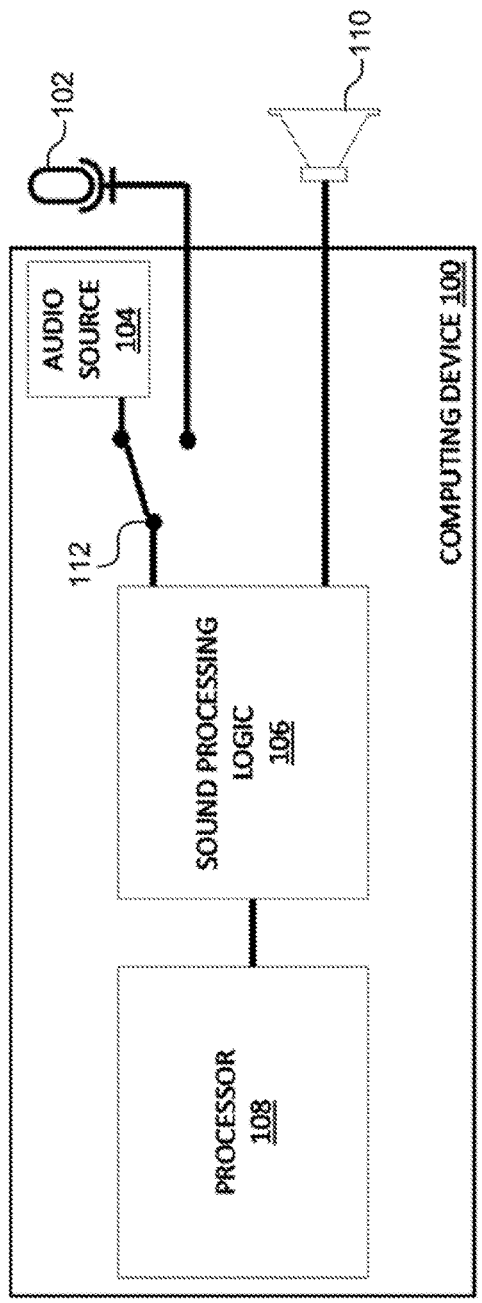

SOUND PROCESSING LOGIC CONNECTIONS

BACKGROUND

Communication technologies, both wireless and wired, have seen dramatic improvements over the past years. As a result, computing devices are equipped with a diverse set of communication or radio interfaces. Through these interfaces, a computing device can establish communications with the computing devices of other users, a central processing system, reach the Internet, or access various data services through wireless or wired networks, As an example, referring to teleconferences, some users may be gathered in a conference room for the teleconference, and other users may be logged into the teleconference from remote locations, where each user, whether local or remote, may be logged into the teleconference from their respective devices. Microphones from each device may enable the users to communicate with each other. At times, when a user desires to remain silent during the teleconference, they may mute the microphone. As an example, a visual indicator may be provided on the computing device to confirm that the microphone has in fact been muted.

BRIEF DESCRIPTION OF THE DRAWINGS

FIGS. 1A-B illustrate a computing device with logic to switch between a microphone and an audio source when toggling between modes that include a privacy solution, according to an example;

DETAILED DESCRIPTION

Figure 2:
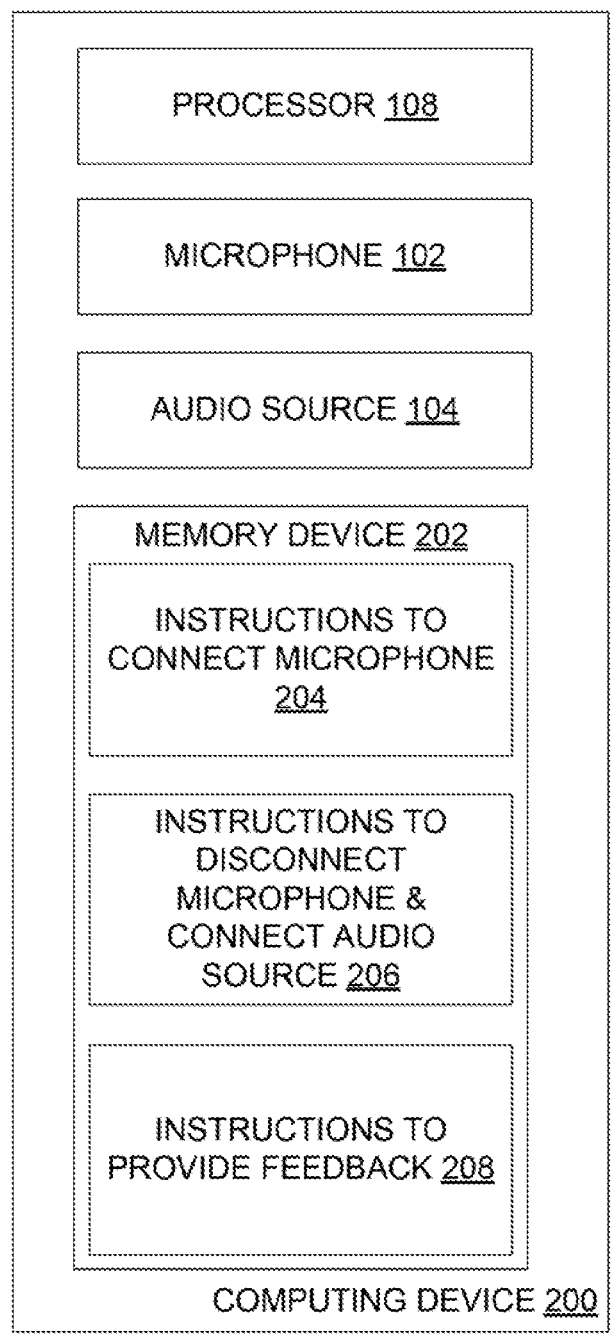
FIG. 2 illustrates a computing device for switching between microphone and audio source when toggling between modes that include the privacy solution, according to an example.

Privacy is a concern for users of such computing devices including microphones. For instance, control may be gained of a microphone in a computing device for a variety of undesired reasons, for example, via malware. For instance, control may be acquired of the microphone included in the computing device and/or access may be gained to audio captured by the microphone, unbeknownst to a user of the computing device. In some approaches, this may be possible even when a user mutes the microphone.

Examples disclosed herein provide the ability trigger a privacy solution, or example, by disconnecting the microphone from sound processing logic of the computing device. Instead, an audio source may be connected to the sound processing logic when the privacy solution is triggered, for example, by the user of the computing device. As is further described, the audio source may generate a repeated fixed signal that is transmitted to the sound processing logic, ensuring, as a result, that the microphone is not connected to the sound processing logic. Rather than muting the microphone to ensure privacy, the privacy solution described herein may redirect signals between the microphone and the sound processing logic of the computing device so that the sound processing logic is instead connected to an audio source that transmits a repeated fixed signal, which the user may readily determine is not coming from the microphone. As a result, the user may be provided with a direct way to verify the result of enabling/disabling the privacy solution.

With reference to the figures, FIGS. 1A-B illustrate a computing device 100 with logic to switch between a microphone 102 and an audio source 104 when toggling between modes that include a privacy solution, according to an example. Computing device 100 may refer to various devices that can establish communications with other computing devices, such as a desktop computer, notebook computer, or a smartphone. As an example, in order to enable communications with other computing devices, computing device 100 includes an audio input device, such as a microphone 102, for receiving audio from a user of the computing device 100, and an audio output device, such as a speaker 110, for the user to receive audio from users of other computing devices. However, as will be further described, once a privacy mode is triggered, the microphone 102 may be disconnected and replaced with audio generated by the audio source 104, ensuring privacy for the user. As an example, the audio source 104 may correspond to a device that generates an audio signal that is customizable and repeated while the computing device 100 is in privacy mode.

As illustrated, computing device 100 may include sound processing logic 106 for processing audio received from the microphone 102 before transmitting to other computing devices, and processing audio received from other computing devices before outputting to the speaker 110. As an example, the sound processing logic 106 may refer to a hardware component in the computing device 100 to which the microphone 102 and speaker 110 connect to, such as a sound card or other sound processing hardware. Applications running on the computing device 100, for example, that plays music or records audio, utilize the sound processing logic 106 that converts between digital data and an audio signal.

Referring to a teleconference as an example, sound/pressure wave signals generated while a user of the computing device 100 speaks into the microphone 102 are converted into electrical signals by the microphone 102, then converted by the sound processing logic 106 to digital data before it is transmitted to other computing devices. Similarly, audio received from other computing devices, received as digital data, may be converted by the sound processing logic 106 to electrical signals before being converted and output to the speaker 110 as sound/pressure wave signals.

As described above, rather than muting the microphone 102 to ensure privacy, a user of the computing device 100 may trigger a privacy mode, as will be further described. Referring to FIG. 1A, the microphone 102 may be electrically connected to the sound processing logic 106, for example, via a programmable logic switch 112. While in this mode, or audio capture mode, audio picked up by the microphone 102 may be processed by the sound processing logic 106, for example, while the user of the computing device 100 is on a teleconference. However, when the user triggers the privacy mode, the programmable logic switch 112 would disconnect from the microphone 102 and connect to an audio source 104, as illustrated in FIG. 1B. As a result, any audio picked up by the microphone 102 is no longer transmitted to and processed by the sound processing logic 106, thereby ensuring privacy for the user. Rather, a repeated fixed signal generated by the audio source 104 would be transmitted to the sound processing logic 106. As an example, rather than switching between the microphone 102 and the audio source 104 when toggling privacy mode, the audio source 104 may always remain connected to the sound processing logic 106, while the microphone 102 connects and disconnects from the sound processing logic 106 when privacy mode is toggled (not illustrated).

As an example, the repeated fixed signal could be a sine wave or an audio file repeating a phrase, such as "The user has enabled privacy mode". The user may also be provided flexibility in customizing the repeated fixed signal. For example, the user may be able to upload their own sound file to be played by the audio source 104 when the user selects the privacy mode. In addition, the user may be able determine other parameters, such as how long to wait before repeating the sound file. As will be further described, the computing device 100 includes a processor 108 to perform operations of the computing device 100, such as when privacy mode is enabled and disabled.

FIG. 2 illustrates a computing device 200 for switching between microphone 102 and audio source 104 when toggling between modes that include the privacy solution, according to an example. The computing device 200 depicts a processor 108 and a memory device 202 and, as an example of the computing device 200 performing its operations, the memory device 202 may include instructions 204-208 that are executable by the processor 108. Thus, memory device 202 can be said to store program instructions that, when executed by processor 108, implement the components of the computing device 200. The executable program instructions stored in the memory device 202 include, as an example, instructions to connect microphone (204), instructions to disconnect microphone and connect audio source (206), and instructions to provide feedback (208).

Instructions to connect microphone (204) represent program instructions that when executed by the processor 108 cause the computing device 200, upon selection of a first mode (e.g., audio capture mode), to connect microphone 102 to the sound processing logic of computing device 200 (e.g., sound processing logic 106). As described above with reference to FIG. 1A, the microphone 102 may be electrically connected to the sound processing logic of computing device 200. As a result, while in the first mode, audio picked up by the microphone 102 may be processed by the sound processing logic of computing device 200, for example, while the user of the computing device 200 is on a teleconference.

Instructions to disconnect microphone and connect audio source (206) represent program instructions that when executed by the processor 108 cause the computing device 200, upon selection of a second mode, to disconnect microphone 102 from the sound processing logic and connect audio source 104 to the sound processing logic. As described above with reference to FIG. 1B, when the user triggers the second mode (e.g., privacy mode), the microphone 102 may no longer be electrically connected to the sound processing logic of computing device 200. Rather, audio source 104 may now be connected, for example, via a programmable switch. As a result, any audio picked up by the microphone 102 is no longer transmitted to and processed by the sound processing logic, thereby ensuring privacy for the user. Rather, a repeated fixed signal generated by the audio source 104 may be transmitted to the sound processing logic, as described above. As described above, the audio source 104 may always remain connected to the sound processing logic, while the microphone 102 connects and disconnects from the sound processing logic 106 when privacy mode is toggled.

Triggering of the second mode may vary. For example, privacy mode may be enabled via a software or hardware feature. As an example, in order to avoid control to be gained of microphone 102, for example, for a variety of undesired reasons which may invade privacy of the user of the computing device 200 (e.g., via malware), enablement of privacy mode may be made possible by a hardware feature rather than a software feature. As a result, an outside agent may not be able to disable privacy mode via a software feature. As an example, triggering of the privacy mode may be carried out by a keypress or a series of keypresses on a keyboard associated with the computing device 200, or via another mechanism besides the keyboard (e.g., a dedicated switch), For example, privacy mode may be triggered by pressing the Caps Lock key four times in a row. As an example, this may not trigger anything in the operating system. Rather, a controller, such as a keyboard controller or embedded controller, may detect the keypress(es) and toggle the privacy mode state by disconnecting the microphone 102 from the sound processing logic and connecting the audio source 104 to the sound processing logic of computing device 200.

Instructions to provide feedback (208) represent program instructions, that when executed by the processor 108 cause the computing device 200 to provide feedback that the second mode is selected. Examples of the feedback may include audio feedback, for example, via a speaker of computing device 200, or visual feedback. With regards to visual feedback, feedback on the privacy mode state may be reported in a number of different ways, for example, from using additional colors or blink patterns on existing LEDs on the computing device 200. As an example, an application could make a firmware call as the result of an event (e.g., Windows Management Instrumentation (WMI) event), to display any state changes or playing the output through the speaker if the user takes some action like performing the keypresses or another trigger.

As described above, once privacy mode is triggered, audio source 104 may be connected to the sound processing logic of the computing device 200, and a repeated fixed signal may be generated by the audio source 104, which is then transmitted to other computing devices, for example, while on a teleconference (e.g., audio file repeating "The user has enabled privacy mode"). As an example, in order to avoid users of the other computing devices in the teleconference from hearing the repeated fixed signal, the user of computing device 200 may select the mute option (e.g., mute button in the communications interface), whereby the processor 108 prevents the repeated fixed signal from being broadcast Memory device 202 represents generally any number of memory components capable of storing instructions that can be executed by processor 108. Memory device 202 is non-transitory in the sense that it does not encompass a transitory signal but instead is made up of at least one memory component configured to store the relevant instructions. As a result, the memory device 202 may be a non-transitory computer-readable storage medium. Memory device 202 may be implemented in a single device or distributed across devices. Likewise, processor 108 represents any number of processors capable of executing instructions stored by memory device 202. Processor 108 may be integrated in a single device or distributed across devices. Further, memory device 202 may be fully or partially integrated in the same device as processor 108, or it may be separate but accessible to that device and processor 108.

In one example, the program instructions 204-208 can be part of an installation package that when installed can be executed by processor 108 to implement the components of the computing device 200. In this case, memory device 202 may be a portable medium such as a CD, DVD, or flash drive or a memory maintained by a server from which the installation package can be downloaded and installed. In another example, the program instructions may be part of an application or applications already installed. Here, memory device 202 can include integrated memory such as a hard drive, solid state drive, or the like.

Figure 3:
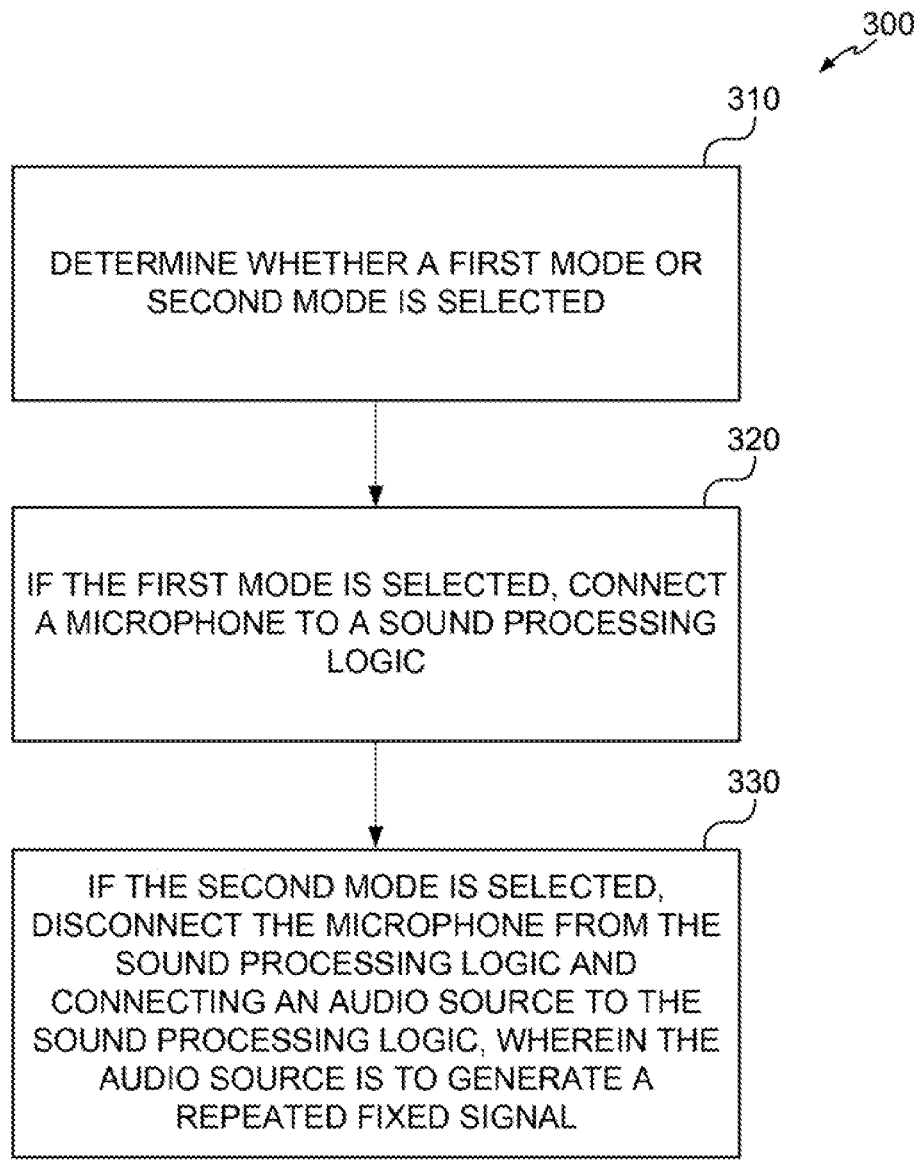
FIG. 3 is a flow diagram in accordance with an example of he present disclosure.

FIG. 3 is a flow diagram 300 of steps taken by a computing device when toggling between modes that include a privacy solution, according to an example. Although the flow diagram of FIG. 3 shows a specific order of execution, the order of execution may differ from that which is depicted. For example, the order of execution of two or more blocks or arrows may be scrambled relative to the order shown. Also, two or more blocks shown in succession may, be executed concurrently or with partial concurrence. All such variations are within the scope of the present disclosure.

At 310, the computing device determines whether a first mode or a second mode is selected. As described above, the first mode refers to an audio capture mode when an audio input device of the computing device, such as a microphone, is enabled to capture audio from a user of the computing device, for example, while the user is utilizing the computing device to communicate via a teleconference. The second mode may refer to a privacy mode, when the user may desire for the microphone not to capture any audio. As described above, the privacy mode may be triggered via a hardware feature, such as a series of keypresses, rather than a software feature. As a result, an outside agent may not be able to disable privacy mode via any software feature. As an example, the first mode may be selected by default, and the computing device may determine when the second mode is selected upon detecting the trigger via the hardware feature (e.g., series of keypresses).

At 320, if the first mode is selected, the computing device connects the microphone to the sound processing logic. As an example, the first mode may be selected by default. As described above with reference to FIG. 1A, the microphone may be electrically connected to the sound processing logic of computing device. As a result, while in the first mode, audio picked up by the microphone may be processed by the sound processing logic of computing device, for example, while the user of the computing device is on a teleconference.

At 330, if the second mode is selected, the computing device disconnects the microphone from the sound processing logic and connects the audio source to the sound processing logic, where the audio source is to generate a repeated fixed signal. As described above with reference to FIG. 1B, when the user triggers the second mode (e.g., privacy mode), for example, via the series of keypresses, the microphone may no longer be electrically connected to the sound processing logic of computing device. Rather, audio source may now be connected, for example, via a programmable switch. As a result, any audio picked up by the microphone is no longer transmitted to and processed by the sound processing logic, thereby ensuring privacy for the user. Rather, a repeated fixed signal generated by the audio source may be transmitted to the sound processing logic, as described above. As described above, the audio source may always remain connected to the sound processing logic, while the microphone connects and disconnects from the sound processing logic 106 when privacy mode is toggled.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other, Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A computing device comprising:
a microphone;
an audio source;
sound processing logic connected to the microphone; and
a processor to:
determine that a privacy mode has been selected;
determine that a mute function has been selected;
disconnect the microphone from the sound processing logic;
connect the audio source to the sound processing logic;
direct audio from the audio source to the sound processing logic instead of from the microphone, wherein the audio source serves as a replacement for the microphone; and
while the privacy mode and the mute function are selected, prevent the audio from the audio source from being transmitted via the sound processing logic to a recipient until the mute function is deselected while the privacy mode remains selected.

2. The computing device of claim 1, wherein, while in the privacy mode, the audio source is to generate a repeated fixed signal that is transmitted to the sound processing logic.

3. The computing device of claim 2, wherein the repeated fixed signal is customizable.

4. The computing device of claim 2, wherein when the mute function is selected, the processor is to prevent the repeated fixed signal from being broadcast.

5. The computing device of claim 1, wherein the processor is to provide feedback when the privacy mode is selected.

6. The computing device of claim 5, wherein the feedback comprises audio feedback and visual feedback, via the computing device.

7. The computing device of claim 1, comprising a programmable logic switch to disconnect the microphone from the sound processing logic and connect the audio source to the sound processing logic when the privacy mode is selected.

8. The computing device of claim 1, wherein the privacy mode is selected via a series of keypresses on a keyboard associated with the computing device.

9. A non-transitory computer-readable storage medium comprising program instructions which, when executed by a processor of a computing device, cause the processor to:

upon selection of a first mode:
  connect a microphone of the computing device to a sound processing logic of the computing device; and
upon selection of a second mode:
  disconnect the microphone from the sound processing logic;
  connect an audio source of the computing device to the sound processing logic;
  direct audio from the audio source to the sound processing logic instead of from the microphone, wherein the audio source serves as a replacement for the microphone;
  provide feedback that the second mode is selected: and
  upon selection of a mute function:
    prevent the feedback to a recipient until the mute function is deselected while the second mode remains selected.

10. The non-transitory computer-readable storage medium of claim 9, wherein, while in the second mode, the audio source is to generate a repeated fixed signal that is transmitted to the sound processing logic.

11. The non-transitory computer-readable storage medium of claim 10, wherein, when the mute function is selected, the program instructions, when executed, further cause the processor to prevent the repeated fixed signal from being broadcasted.

12. The non-transitory computer-readable storage medium of claim 9, wherein the second mode is selected via a series of keypresses on a keyboard associated with the computing device.

13. A method of a computing device, the method comprising:
  determining whether a first mode or a second mode is selected;
  if the first mode is selected, connecting a microphone to a sound processing logic; and
  if the second mode is selected:
    disconnecting the microphone from the sound processing logic;
    connecting an audio source to the sound processing logic;
    directing audio from the audio source to the sound processing logic instead of the microphone, wherein the audio source:
      serves as a replacement for the microphone; and
      generates a repeated fixed signal: and
    while the second mode and the mute function are selected, prevent the audio from the audio source from being transmitted via the sound processing logic to a recipient until the mute function is deselected while the second mode remains selected.

14. The method of claim 13, wherein when the mute function is selected, preventing the repeated fixed signal from being broadcast.

15. The method of claim 13, providing feedback when the second mode is selected.

* * * * *